United States Patent [19]

Noble et al.

[11] Patent Number: 5,075,553

[45] Date of Patent: Dec. 24, 1991

[54] IR SENSOR FOR A SCANNED STAGGERED ELEMENT LINEAR ARRAY HAVING IMPROVED COLD SHIELDING

[75] Inventors: Milton L. Noble, Liverpool; James B. MacHaffie, East Syracuse; Howard P. Steiner, North Syracuse, all of N.Y.

[73] Assignee: General Electric Company, Syracuse, N.Y.

[21] Appl. No.: 425,413

[22] Filed: Oct. 23, 1989

[51] Int. Cl.$^5$ .............................................. G01J 5/08
[52] U.S. Cl. ................................. 250/352; 250/332; 250/334; 250/370.15
[58] Field of Search ................ 250/352, 370.15, 332, 250/334

[56] References Cited

U.S. PATENT DOCUMENTS

| | | | |
|---|---|---|---|
| 3,963,926 | 6/1976 | Borrello | 250/338.1 |
| 4,431,918 | 2/1984 | White | 260/338.1 |
| 4,910,401 | 3/1990 | Woods | 250/332 |
| 4,914,299 | 4/1990 | Jungkman et al. | 250/352 |

Primary Examiner—Constantine Hannaher
Attorney, Agent, or Firm—Richard V. Lang; Paul Checkovich; Fred Jacob

[57] ABSTRACT

The invention relates to a cold shielding arrangement for use with either an individual staggered element linear IR array or a staggered arrangement of a plurality of such arrays. The cold shielding arrangement consists of a slitted plate spaced from the arrays, each slit being arranged to restrict the field of view of the pixels in both columns of one array in the scanning direction, and a pair of interdigitated pixel level cold shields set on the surface of each array to restrict the field of view of the pixels in the resolution direction.

16 Claims, 6 Drawing Sheets

FIG. 2A
FIG. 2B
"SLIT" COLD SHIELD (TOP VIEW)
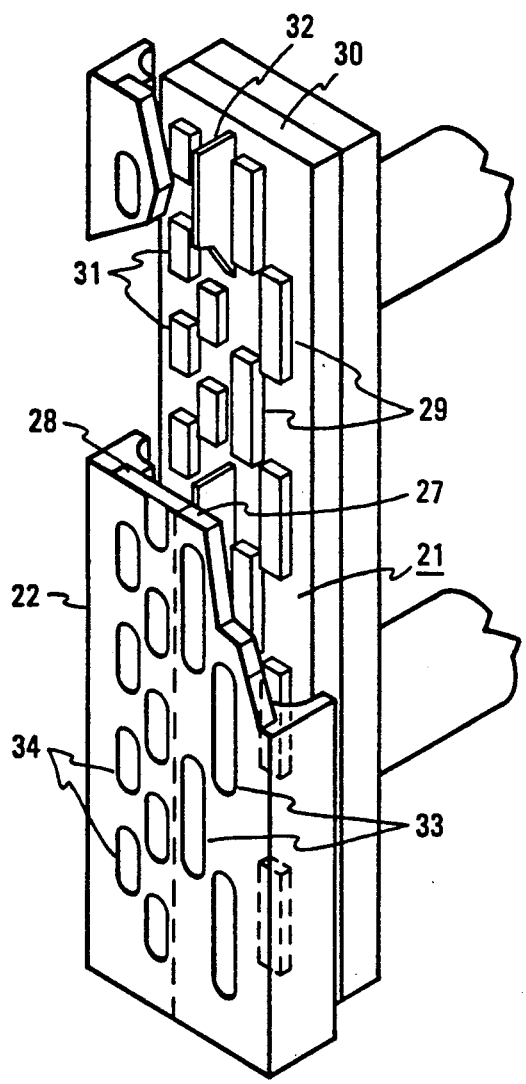
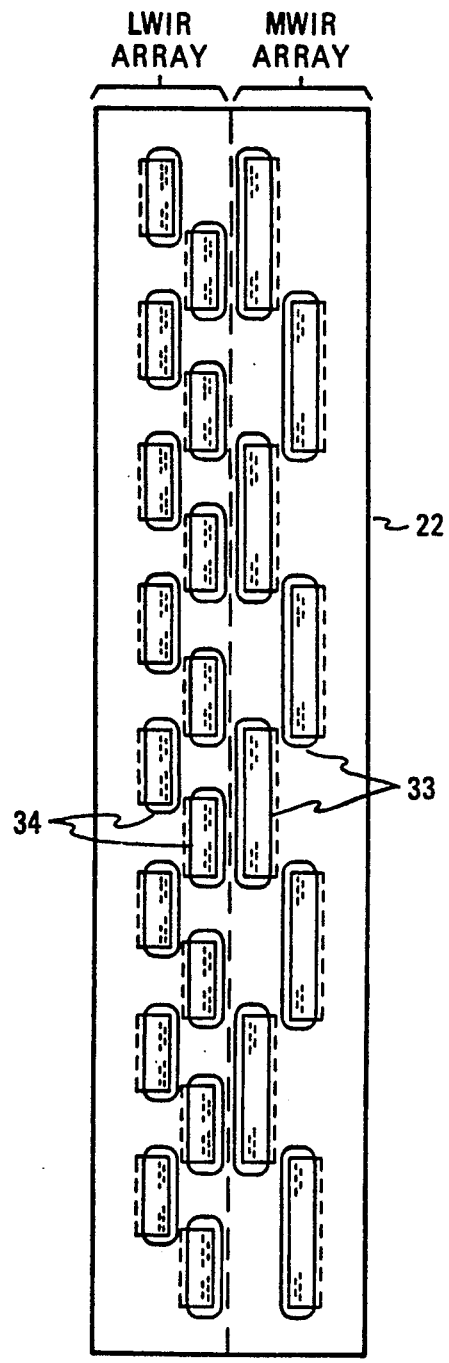

FIG. 3A PIXEL LOOK-ANGLE DEFINITION OF "SLIT" COLD SHIELD PLATE
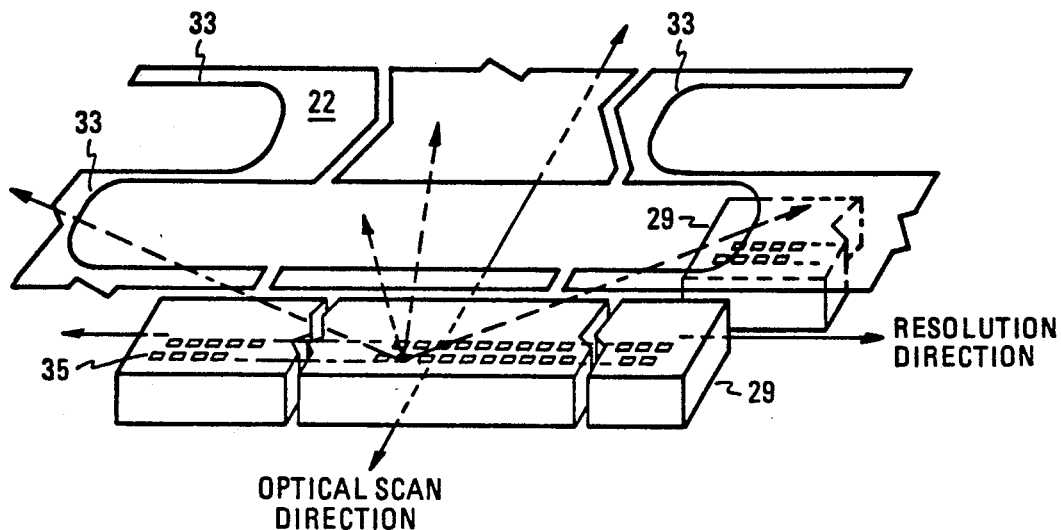
FIG. 4
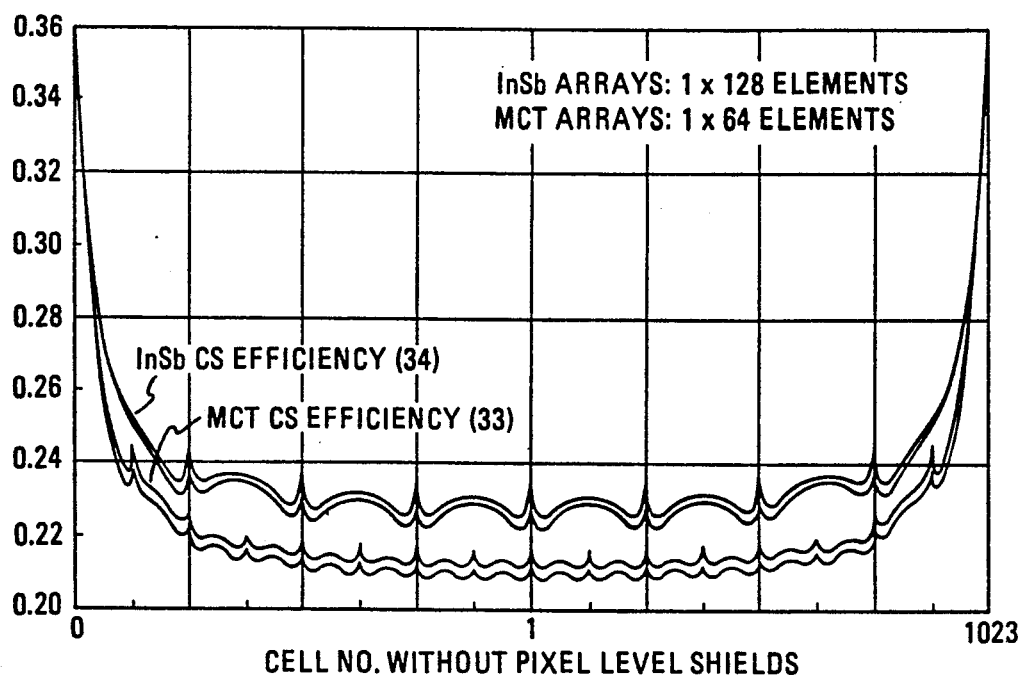

FIG. 3B PIXEL ANGULAR FIELD IN RESOLUTION DIRECTION
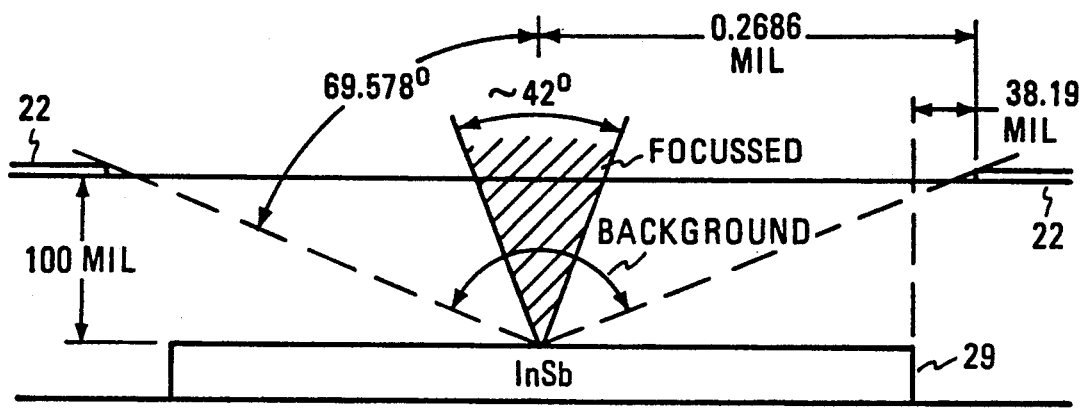
FIG. 3C PIXEL ANGULAR FIELD IN OPTICAL SCAN DIRECTION
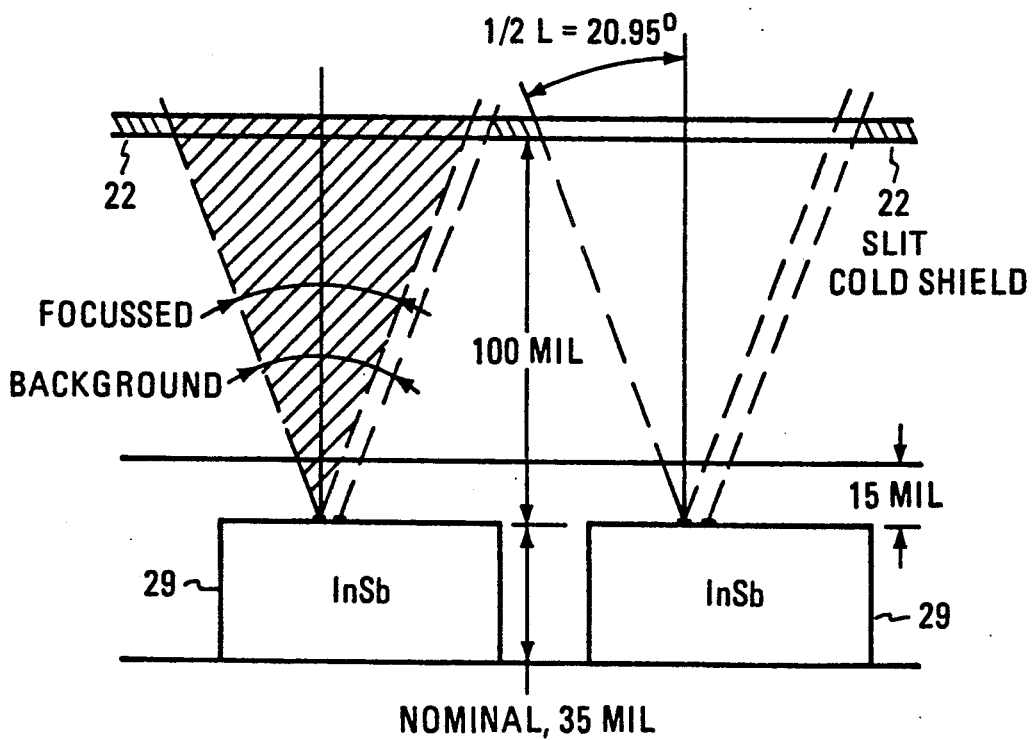

FIG. 5A
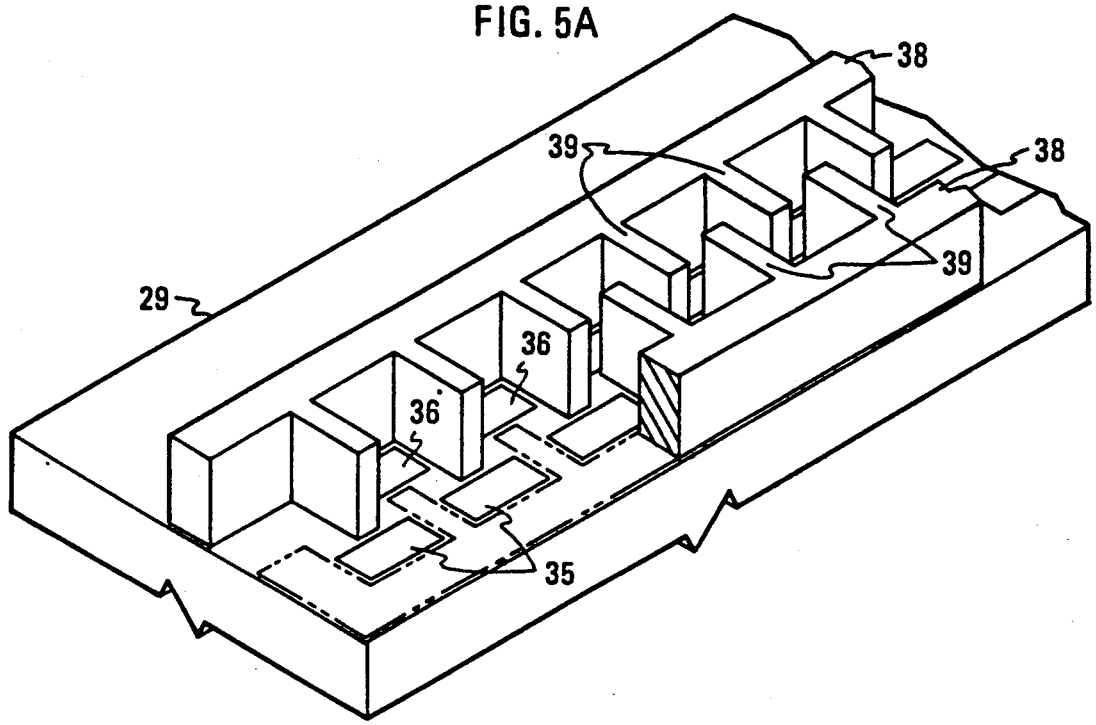
FIG. 5B PIXEL ANGULAR FIELD IN RESOLUTION DIRECTION
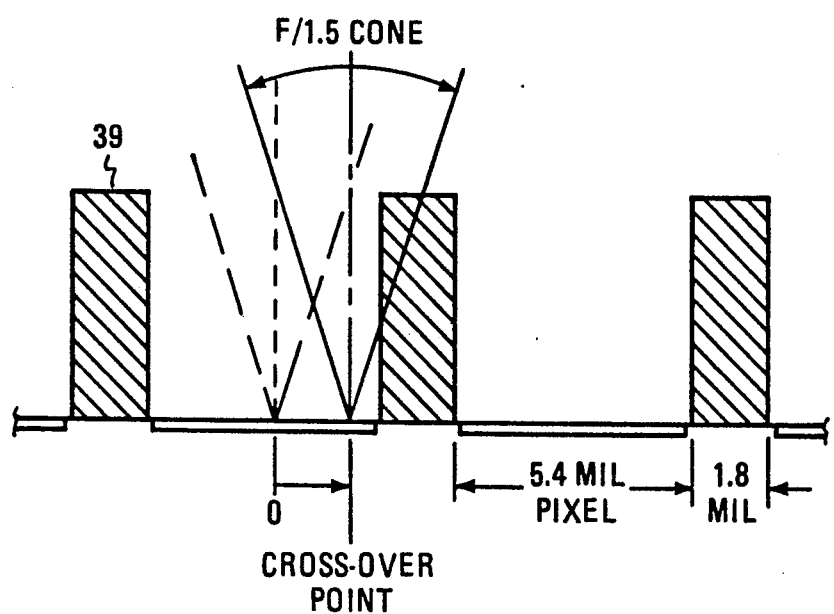

IR SENSOR FOR A SCANNED STAGGERED ELEMENT LINEAR ARRAY HAVING IMPROVED COLD SHIELDING

BACKGROUND OF THE INVENTION

1. Field of the Invention

The invention relates to IR sensors incorporating scanned staggered element linear arrays of IR detectors maintained at cryogenic temperatures and more particularly to the provision of improved cold shielding for such arrays.

2. Prior Art

Effective cold shields are required for infrared arrays to limit the unfocused illumination incident on the array. With line arrays, the simplest approach is to locate the IR array in a cold shielded container, to hold the unfocused radiation to a negligible level compared with the focused radiation from the scene. One known approach is to pass the focused radiation from the optics through a long narrow slit. When the optics are of low speed, i.e. high F/#, this simple approach is very effective. When the optics are required to be "fast", i.e. of low F/#, the slit must be made quite wide and then considerable unfocused background illumination can fall on the IR detector, which will seriously degrade the target contrast, and in consequence, the dynamic range and ultimate sensitivity of the system.

When a fast optical system is employed to obtain the highest IR system sensitivity in a scanning infrared sensor it is difficult to maintain high cold shielding efficiency. Cold shielding efficiency may be defined as the ratio of focused to unfocused radiation incident on the IR detector. The problem with wide angle systems is that they present large areas of relatively high temperature IR radiating surfaces to the IR sensors. Such surfaces include the internal barrels of the optics and to a lesser degree the optical elements themselves. At the limit, the unfocused background of individual photo detectors in an IR detector array may have an angular field of view equal to a full hemisphere. The object for the ideal cold shield is to prevent IR background radiation lying outside the focused angular field of view from reaching the individual photodetectors.

A known cold shield approach operates at the pixel level for line arrays. The shield is formed making use of the anisotropic etching properties of silicon. An anisotropic etch is used to form a series of apertures in a thin silicon plate which is positioned over the line array to limit the acceptance field of each individual pixel. This known method of forming pixel level cold shield apertures is limited in constraining the pixel angular field in the optical scan direction due to the non-rectangular nature of a silicon preferentially etched aperture. The pair of end walls of such etched slots are not normal to the almost perfectly vertically defined pair of side walls.

The more critical limitation of the preferentially etched silicon apertures of the known approach is in application to arrays with over-lapped pixels in a staggered element linear array. This array type constitutes the majority of linear IR array applications of interest today. In a simple non-staggered element linear array, the enlarged non-normal end walls of the preferentially etched apertures cause only the minor problem noted above, but in the staggered element linear array, the end effects of one aperture spoil the overlapped apertures of neighboring pixels, thus greatly compromising the IR background restriction gained in application to a simple non staggered linear array.

Even if the cold shield using preferentially etched silicon could achieve perpendicular end walls on all four sides of the aperture, the geometry of the overlapped pixel staggered element array precludes effective use. In a staggered element line array the pixels lie in closely spaced adjacent columns, the pixels in one column being off-set by half the pixel interval from the pixels in the other column. Under these circumstances, perfectly rectangular apertures for the pixels in one column would enlarge the angular field of view and so worsen the cold shielding for pixels in the other column.

SUMMARY OF THE INVENTION

It is an object of the invention to provide in an IR sensor improved cold shielding means for a staggered element linear array.

It is another object of the invention to provide in an IR sensor, improved cold shielding means for an extended linear array, itself consisting of a staggered arrangement of monolithic linear IR arrays, each monolithic array itself consisting of a staggered arrangement of pixels.

These and other objects of the invention are achieved in accordance with the invention in a scanned linear IR array by a novel combination, comprising an enclosure normally maintained at ambient temperature, having an aperture for admitting IR radiation and containing optical means for focusing IR image radiation upon a focal plane; a cryogenically cooled, evacuated Dewar enclosing the focal plane, the Dewar having an IR transparent window; a staggered linear IR detector array positioned at the focal plane within the Dewar, and cold shielding means installed within the Dewar for reducing the amount of unfocused IR radiation impinging on the staggered linear array.

Further in accordance with the invention, the cold shielding means includes a first cold shield comprising an elongated slit spaced from the staggered linear array and oriented to intercept radiation exceeding the focused pixel angular field measured in the scanning direction, and a second and a third cold shield supported in proximity to the pixels in the staggered linear array, the second shield including successive walls disposed between successive first column pixels, and the third shield including successive walls disposed between successive second column pixels, the walls being oriented to intercept radiation exceeding the focused pixel angular field measured in the resolution direction.

In practice, the actual pixel angular fields are established to optimize the ratio of focused image radiation entering the aperture to unfocused IR radiation from said enclosure.

Further in accordance with the invention the second and third cold shields each consist of an elongated bar-shaped member from which a plurality of slat shaped projections extend at right angles to form the walls earlier mentioned, the projections from the respective cold shields being interdigitated.

The second and third cold shields are preferably nonreflective and may be formed of an easily machined material like silicon or even harder materials like alumina.

In an embodiment, in which the individual staggered element linear arrays are arranged into an extended linear array, with the individual arrays staggered, the first cold shield may consist of a single plate with plural slits, one slit arranged over each IR array, and each IR array being provided with pixel level cold shields.

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings, in which:

FIG. 1A being a cut-away perspective view of the IR sensor showing both the optics and portions of a novel high efficiency cold shielding means and a Dewar associated with an extended linear array sensitive to both medium wave infrared (MWIR) and long wave infrared (LWIR); and FIG. 1B being a simplified optical schematic of the Schmidt derived optical system;

FIGS. 2A and 2B are respectively a partially cut-away, perspective view covering the extended linear array, and a plan view of a slitted cold shield assembly illustrating the position of the slits in the slitted cold shield plate in respect to the individual staggered IR array making up the extended linear array;

FIGS. 3A, 3B and 3C illustrate the positioning and effectiveness of the cold shield slit plate in position over a staggered pair of IR arrays; FIG. 3A illustrating the positioning and resulting pixel angular fields in perspective; FIG. 3B illustrating the resulting pixel angular field in the resolution direction; and FIG. 3C illustrating the resulting pixel angular field in the optical scan direction;

FIG. 4 is a graph of the cold shielding efficiency provided by the slitted cold shield plate for each of the pixels in a dual band array with both long wave and medium wave portions in an extended linear array;

FIGS. 5A and 5B illustrate the positioning and effectiveness of the pixel level cold shields which form a second portion of the high efficiency cold shielding means; FIG. 5A being a partially cut-away perspective view of a portion of an IR array showing the pixel level cold shields, and FIG. 5B being a cross-section view in the resolution direction, illustrating the positioning and effectiveness of pixel level cold shields.

DESCRIPTION OF THE PREFERRED EMBODIMENT

Figure 1A:
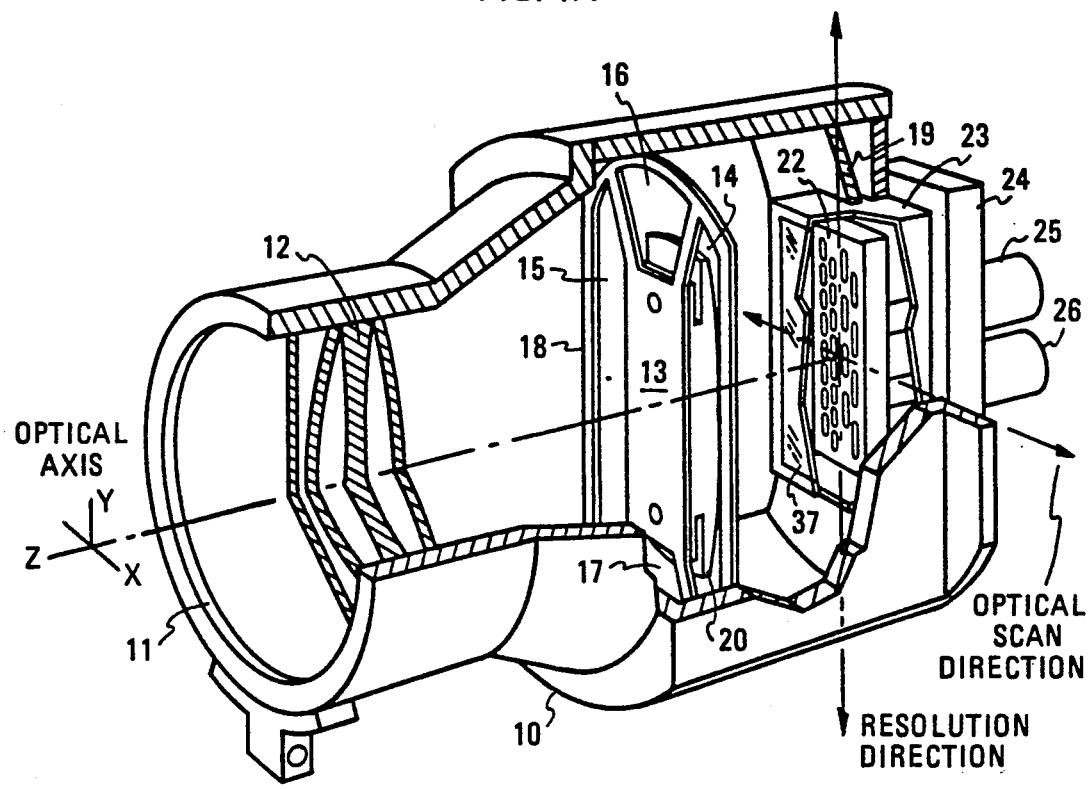
FIGS. 1A and 1B illustrates a particular IR sensor and the optical system within the sensor.
Figure 1B:
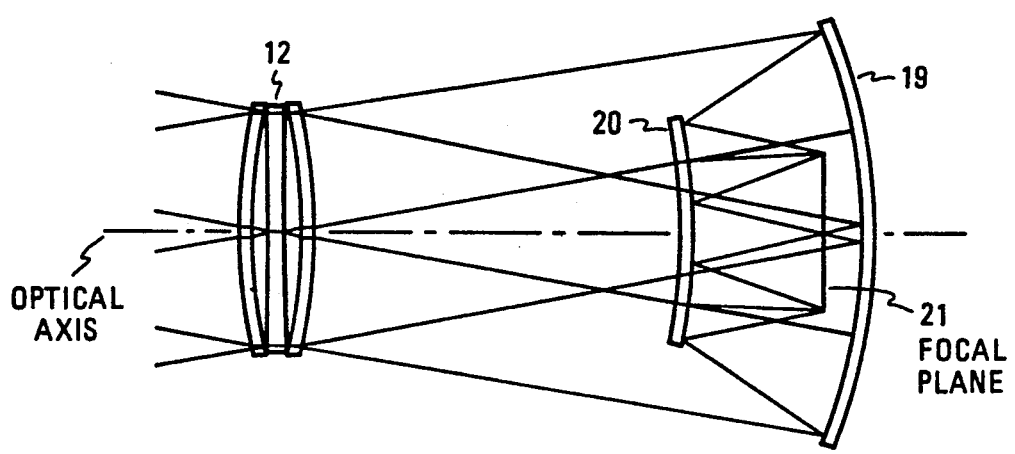

An IR sensor having improved cold shielding efficiency and employing folded telescopic optics is illustrated in perspective in FIGS. 1A and 1B. Use with a dual band focal plane and the use of reflective optics as shown in FIGS. 1A and 1B, represent only one of many possible applications of Applicants' novel cold shielding means.

The IR sensor herein described is a portion of an IR imaging system in which means are provided for imaging successive narrow vertical sectors of an object field, upon an IR sensor in the focal plane of the optics as the object field is scanned. The scanning, typically involves rotating the field of view about a vertical axis, to which the major axis of the linear array is parallel, which captures the object field, sector by sector. During this process a sequential electrical signal is obtained, suitable for reconstructing a two dimensional image of the object field. The scanning means and the reconstruction electronics may be of a conventional nature.

The IR optic includes an enclosure 10 for enclosing and supporting a Schmidt derived telescopic optical system and a cryogenically cooled IR Dewar. In this optic, a cylindrical opening 11 is provided at the front of the enclosure for supporting a refractive phase corrector 12. The axis of the cylindrical opening provided at the front (to the left in FIG. 1A) of the enclosure defines the optical axis of the optical system. The light passing through the phase corrector 12, continues via the apertures (14, 15, 16 and 17) in the apertured plate 18 to a forward-facing primary (concave) mirror (19) installed on the back wall of the enclosure and having a central cutout for the IR Dewar 23 containing an IR sensor. The mirror 19 then reflects light forward to a truncated, backward-facing convex mirror 20, centrally supported upon the back surface of the apertured plate 18. The mirror 20 reflects a focused image upon the IR sensor, which takes the form of an extended linear array 21 (not shown in FIGS. 1A and 1B) disposed within the Dewar 23 and behind the slitted cold shield plate 22.

The optical elements 12, 19, 20 are designed and are aligned upon the optional axis (Z dimension) of the optical system to provide a relative aperture of approximately F/1.4. The amount of light which is transmitted to the focal plane of the optical system is approximately two-thirds of the light collected at the aperture 11.

The optical elements 12, 19, 20 and the apertured plate 18 are aligned in relation to the scanning direction of the IR sensor. The extended linear IR array (first seen in FIG. 2A) has its major axis oriented vertically, parallel to the Y axis and orthogonal to the Z axis, forming the optical axis of the optical elements. Thus the resolution direction of the array, depicted in FIG. 1A, is parallel to the Y axis. The array is designed to be scanned in a direction orthogonal to the resolution direction as also depicted in FIG. 1A.

A necessary feature of the optical design, so far described, is that the enclosure 10, the apertured plate 18, and the optics at the front and within the enclosure (12, 19, 20) must be maintained at ambient temperature, while the extended IR detector array (21) must be maintained at a cryogenic temperature (e.g. 65-70° K) for sensitivity. To sustain these temperature differentials, the array 21 is set within the Dewar 23 behind an IR transmissive window 37 in the Dewar wall. The window permits transmission of the IR through the Dewar to the array 21. The Dewar extends into the enclosure 10, as shown.

A natural consequence of the design is that the interior surfaces of the enclosure 10 and to a lesser degree the surfaces of all the optics are at a 300K ambient temperature and become sources of unfocused IR radiation. All unfocused IR radiation forms an undesirable background to any focused IR signal. The ratio of the focused IR signal to the unfocused IR background i.e. the signal to noise ratio is reduced, thereby reducing both the sensitivity of the system and the dynamic range.

The cold shielding measures, which are about to be described, are designed consistently with the F/1.4 relative aperture of the optical system to prevent as much as possible the unfocused IR radiation originating within the sensor from impinging upon the IR detectors making up the extended linear array.

The cooling of the extended linear array 21 (best seen in FIGS. 2A and 2B) is achieved by setting it within a Dewar (mounted at the back of and extending within the sensor) using cryogenic coolers 25 and 26 (mounted at the back of and extending outside of the enclosure). The walls 23 of the Dewar, closed at the inner end by the IR transmissive window 37, mentioned earlier, enter the enclosure to form a rectangular enclosure surrounding the extended linear array 21. The slitted cold shield plate 22, together with a (two-part) dual band infrared filter 27, 28 form a focal plane assembly positioned at the focal plane of the optical system. A rectangular flange 24 provides means for supporting the Dewar within the IR sensor. The Dewar walls 23 are fitted within the central cutout made in the concave reflecting mirror. At the back surface of the focal plane assembly, conductive thermal contact is made with two cylindrically shaped cold fingers of cryogenic coolers 25 and 26. These coolers are designed to maintain the array at the desired cryogenic temperatures. Preferably the cryogenic cooler is inserted into cylindrical wells, which allow the Dewar chamber to remain sealed, as a cryogenic cooler is being replaced.

The extended linear array is accordingly set near the innermost extension of the Dewar, where it is surrounded on its sides and back surface with cryogenically cooled opaque surfaces, which have a negligible contribution to the IR background level. On the front surface, the extended linear array is provided with IR transmitting filters (for medium wave (27) and for long wave (28) IR), over which the slitted cold shield plate 22 is supported. Both the filters 27, 28 and the slitted cold shield 22 are maintained at cryogenic temperatures, which makes a negligible contribution to the IR background level.

The slitted cold shield 22 is a significant part of the cold shielding means designed to screen out unfocused IR background, originating from the interior of the optic. The cold shield 22 is best seen in FIGS. 2A and 2B. In a 1024 element dual band design shown here, the extended linear array consists of an assemblage of eight medium wave infrared (MWIR) 1×128 element arrays 29 assembled in a staggered linear sequence upon the right half of the substrate 30 and an assemblage of sixteen long wave infrared (LWIR) 1×64 element arrays 31 assembled in a staggered linear sequence upon the left half of the substrate. The MWIR array 29 consist of a plurality of InSb pixels, and the LWIR array 30 consists of a plurality of HgCdTe pixels. In each array, the pixels are arranged in two adjacent columns, mutually shifted along the major axis of the array by half interval spacings. The columns of pixels, and the major axis of each of the arrays 29 and 31 are oriented parallel to the major axis of the substrate 30 and to the resolution direction of the extended linear array 21.

Continuing, the eight MWIR arrays 29 are staggered in two adjacent columns, and the sixteen LWIR arrays 31 are staggered in two adjacent columns, the MWIR and LWIR arrays being separated by a vertical barrier 32 and set behind different IR filters (27, 28) as earlier noted. The individual MWIR or LWIR arrays, as seen in either FIG. 2B or 3A, are maintained at a prescribed spacing in their respective columns to maintain an equal pixel interval in the resolution direction from pixel 1 to 1024. This requires a small overlap between consecutive arrays in the Y dimension. The columns of arrays are mutually offset in the optical scan direction by an amount designed to permit efficient cold shielding and at a distance representing a small fraction of the distance scanned during an integration time. The illustrated plan view of FIG. 2A is substantially to scale for the dual wave sensor under discussion.

The slitted cold shield plate 22 is arranged in parallel spaced relationship with respect to the pixel bearing surface of each IR array. The plate 22 is designed to intercept IR radiation exceeding a desired acceptance angle (or angular field of view) measured in the XZ plane and orthogonal to the axis of the array as seen at the sites of each pixel. This is achieved by providing a slit (33, 34) for each MWIR and each LWIR array, arranged on the pixel sites (illustrated in FIG. 2B). The major axis of each slit is aligned with a line midway between each column of pixel sites on each array. In addition, the ends of each slit are aligned with the ends of each array to provide equal screening angles for the end pixels.

The cold screening effectiveness of the slits may be appreciated by reference to FIGS. 3B and 3C. Assuming a given F/# for the optical system (12, 19, 20), the cold shielding is designed to provide optimum acceptance of focused IR radiation. Assuming that the F/# is 1.4, which corresponds to a cone whose central angle is approximately 42°, the dimensions of the slit are set to provide an acceptance angle of no less than this amount for all the pixels of the array. As seen in FIG. 3B, which shows the angular field view at each pixel in the resolution direction, the central pixels are only slightly shielded with the angular field of view defined by the end surfaces of a slit being approximately 70°. The ends of the slits are rounded so as to define an acceptance cone having a central angle of at least 42° for the end pixels in both columns. This prevents a reduction in sensitivity to focused radiation at the ends of the array.

As seen in FIG. 3C, which shows the angular field of view in the optical scan direction, all the pixels in the two arrays have angular fields only slightly greater than 42°. The pixels are disposed in two adjacent columns with the interval between columns being typically 5.2 mils and the distance between the slit and the array being between 80 and 100 mils. The aperture of the slit used for two adjacent columns is widened slightly (a few degrees) to allow a 42° cone for members in both columns. This only adds a few degrees to the angular field beyond the optimum of 42°.

The cold shielding efficiency in the scanning direction is maintained until one reaches the ends of the array. The web between slits in adjacent columns remains wide along the central portions of each array and thus provides efficient cold shielding action except at the very ends of the arrays where the web narrows as the slit for the adjacent array in a staggered position begins (as one proceeds in the direction of resolution).

A graph of the cold shielding efficiency entailing only the slitted cold shield plate and based on computed data is illustrated in FIG. 4. It illustrates both the performance of the slits 33 associated with the longer InSb arrays, and the performance of the slits 34 associated with the shorter HgCdTe arrays. The graphs are illustrated as continuous whereas the actual data is computed for points of successive odd and even pixels from alternate columns on successive IR arrays. In the illustrated arrangement, the pixels in one column perform less favorably than those in the other column. This difference is small. The cold shielding efficiency is slightly better (approximately 2%) for the longer InSb arrays. In both cases cold shielding efficiency increases slightly with the pixels at the ends of the individual arrays. At the ends of the extended linear array (i.e. through the pixels making up the initial and final arrays), the improvement is considerably greater (up to 36%).

As implied in FIGS. 3B and 3C, the slitted cold shield plate 22 enhances the cold shielding efficiency only in the optical scan direction. The pixel level cold shields, now to be described, enhance the cold shielding efficiency primarily in the resolution direction.

The pixel level cold shields are shown at 38, 39 in FIGS. 5A and 5B. The pixel level cold shields are formed of two like parts, one part to the front providing a cold shield for each pixel (35) in the near column in an array, and a like part to the rear providing a cold shield for each pixel (36) in the remote column of the array. Each array carries its own pixel level cold shield. As stated above, the pixel level cold shields improve the cold shielding efficiency at each pixel by limiting the angular field of view in the resolution direction. The pixel level cold shields are supported directly upon the upper surface of the array in good enough thermal contact so that they will remain at a low temperature and do not contribute materially to the IR background. The complete cold shielding arrangement, combining the slitted cold shield and the pixel level cold shields may be designed to provide up to a 90% cold shielding efficiency, assuming that a reduction in optical transmission to about 70% at the pixel cross-over point is acceptable.

The pixel level cold shields are designed to fit upon the surface of the chip on which each IR array is formed, and to fit between the photo-sensitive regions of pixels without causing an excessive reduction in incident focused IR radiation. Each cold shield includes a bar shaped member 38, which supports a plurality of slat shaped projections 39, extending at right angles from the bar and oriented perpendicular to the surface of the chip. The projections from one cold shield for one column of pixels extend toward the other cold shield, but stop short of the pixels in the other column, thus forming an interdigitated structure.

The interdigitated projections 39 form low walls oriented parallel to the resolution direction which reduce the pixel angular field of view in the resolution direction. The projections are designed to fit between the ends of consecutive pixels in the same column, and have a height selected to achieve the desired angular field of view over each photo-sensitive region. The angular field of view is not constant through a given photo-sensitive region of a pixel, being larger at the center of the region where the shielding projections are more remote and smaller at a portion displaced from the center, where the shielding projections are less remote. The point is illustrated in FIGS. 5B and 6.

FIG. 5A shows the pixel level cold shields in relation to the photo-sensitive regions in a particular example. The pixels, in this particular array, include photo-sensitive regions approximately 5.4 mils in length by 3.0 mils in width spaced along the resolution direction at 7.2 mils intervals which provide 1.8 mil separations. The two columns are spaced along the scan direction at a 5.2 mil interval which provide 2.2 mil separations. These dimensions are suitable for both the InSb and HgCdTe arrays in the subject dual band array. As earlier noted, the two columns are mutually staggered in the direction of resolution by half the spacing interval (i.e. 3.6 mils). The overlapping pixel intervals are maintained between individual arrays with the last pixel on one individual array overlapping the initial pixel on the succeeding array by half the spacing interval.

The bars 38 of the pixel level cold shields, have the primary function of supporting the projections 39 which form the primary portion of the pixel level cold shields and which restrict the angular field of view in the resolution direction. The bars 38 provide no restriction of the angular field of view in the scanning direction; this function is performed by the slitted cold shield plate.

Figure 6:
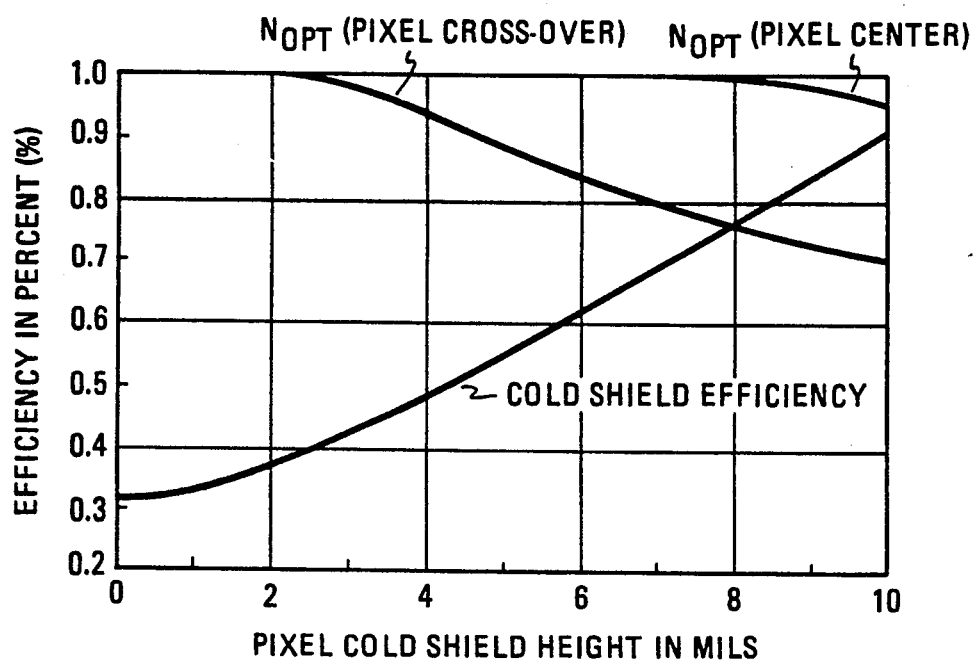
FIG. 6 is a graph of the cold shielding efficiency and optical efficiency of a pixel level cold shield measured at a point at the center and at a point off-set 2.05 mils from the center of the photosensitive region.

The cold shielding efficiency in the pixel level cold shields is graphed in FIG. 6 in relation to a point in the center of the pixel, and a point displaced 2.075 mils from the center. The displaced point corresponds to the point of cross-over from a pixel in one column to the nearest pixel in the adjacent column. The cross-over is the position measured in the resolution direction of the focal plane at which a point of light visualized as moving in the scan dimension produces a light response in the one pixel diminished from a maximum response and so becomes equal to the light response in the nearest pixel in the second column in which an increase from the minimum is taking place. As shown, the cold shield efficiency, increases from 0 to slightly over 90%, over a height increase from 0 to 10 mils,. There is only a minor decrease in optical efficiency over this height range at the center of the pixel. At the cross-over the optical efficiencies falls to about 70% as the pixel cold shield is raised to 10 mils. This establishes a compromise with a height in the region of 5 to 10 mils. The height of 7+ mils appears to be optimum under the illustrated circumstances.

The performance of the pixel level cold shields may be generally enhanced by being coated with a non-reflective or black coating, optionally roughened. The cold shields may be fabricated from a range of materials like silicon or alumina, the latter having the advantage of being non-conductive, and so may be in contact with the top surface of the photodetector chips without adversely affecting array performance. Silicon, however, may also be used taking care to insure an electrically insulated layer adjacent to the IR array chips. As earlier noted, the thermal contact between the cold shields and the photodetector chip should be sufficient to minimize background IR radiation.

Figure 7:
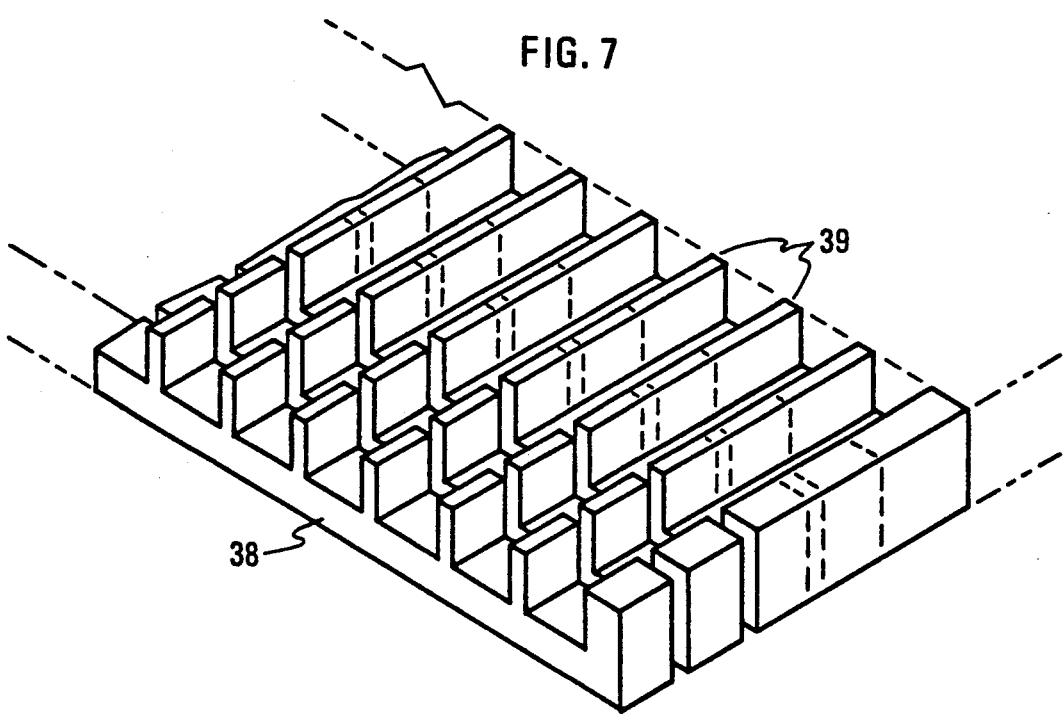
FIG. 7 is an illustration of a stage in the making of the pixel level cold shield illustrated in FIGS. 5A and 5B.

The pixel level cold shield may be simply constructed by a succession of micromachining operations as illustrated in FIG. 7.

A diamond saw blade may be used to micromachine a wafer of silicon or alumina. The saw should preferably be selected to have the required kerf for the proper width slot. The slot is matched to the pixel dimension and a sequence of slots are cut at the array pitch, with a depth matched to the separation between the staggered pixels. Next the wafer is cut completely through to separate the individual cold shields, with the shield thickness being matched to the required height (e.g. from about 5 to 10 mils).

Use of the diamond wafer saw is a simple low-cost method of fabricating the cold shields from a variety of materials like silicon or alumina.

The pixel level cold shield is bonded directly to the infrared array using low-outgassing epoxy compounds. Critical alignment is required only in the resolution direction, as the slit cold shield restricts the unfocused background in the optical scan direction. Due to the extremely large temperature excursion required of the cryo-cycled focal plane it is necessary to bond the pixel level cold shields in a manner to avoid bonding rupture due to any thermal expansion mismatch between the IR array and the pixel level cold shield. Another consideration in direct bonding is to avoid potential shorting of conductive metal runs on the array top surface. The shorting problem can be overcome with a dielectric film, either on the IR array surface or the mating pixel level cold shield, or by using a non-conductive material like alumina for the cold shield. Conductive materials like silicon, which is used for its free machining properties (e.g. freedom from edge chipping), can be covered with layers of SiO2 or similar non-conductive surface films.

The silicon pixel level cold shields normally have a thermal mis-match with the IR array materials on the longer 128 element array (e.g. pitch of 3.6 mils) which is sufficiently large to require precautions in the attaching process. In this case, the cold shields should be rigidly bonded at their centers allowing axial movement of their ends in relation to the array. The pixel level cold shields made with alumina may be bonded directly with epoxy at each end, and give excellent cryo-cycling results.

An alternative to epoxy bonding of the pixel level cold shield to the IR array is by means of an indium bump interconnect process. The latter requires an array specifically designed for indium bump interconnection and additional process steps necessitated because the pressure joining process precludes the presence of a soft non-specular black absorbing layer during pressure joining.

Finally, it should be observed that in an extended linear array in which the component linear arrays are arranged in staggered columns and in which the pixels of the component linear arrays are arranged in staggered rows, the arrangement of plural slits and interdigitated pixel level cold shields retains a high cold shielding efficiency. In particular the cold shielding efficiency is not impaired by the necessary crowding beyond that illustrated in the performance curves of FIGS. 4 and 6.

The interdigitated pixel level shields allow the angular field of view of a first column pixel half overlapped in the resolution dimension with an adjacent second column pixel to be independently established and non-interfering. Similarly the slitted cold shield, which restricts the field of view in the scanning dimension may be placed sufficiently far away (80-100 mils) from two relatively closely spaced (5.2 mil spacing interval) columns of pixels, so that the cold shielding efficiently remains high for both columns of pixels as shown in FIG. 3C, the excess angular coverage being less than 4° in a cone of 42°.

The cold shielding efficiencies when applied to an arrangement of staggered arrays is also not impaired by the crowding. Here geometry dictates that the final pixels from one array be followed in an uninterrupted, non-overlapping sequence by the initial pixel from the succeeding array (in the resolution dimension). This factor reduces the overlap in the resolution dimension between successive slitted cold shields, functioning in the scanning dimension, and produces only a limited reduction in the cold shielding efficiency at these transitions as shown in FIG. 4. Had the arrays themselves been arranged in a half, staggered arrangement, with the arrays half overlapped, the cold shielding efficiency in the scanning direction would not be so greatly improved by the slits.

The present novel cold shielding means thus presents a significant improvement in cold shielding for a staggered arrangement of staggered element line arrays in an IR sensor.

What is claimed is:

1. In an IR sensor for a scanned staggered element linear array, a combination providing improved cold shielding efficiency, comprising;

(A) an enclosure normally maintained at ambient temperature, having an aperture for admitting IR radiation and containing optical means for focusing IR image radiation entering said aperture upon a focal plane, (B) a cryogenically cooled, evacuated Dewar enclosing said focal plane, said Dewar having an IR transparent window, (C) a staggered linear IR detector array positioned at said focal plane within said Dewar, the axis of the array defining the resolution direction and oriented orthogonal to the scanning direction, the staggered linear array further including first and second columns of pixels, the two columns being spaced apart, with the pixels in the first column being shifted in relation to the pixels in the second column, (D) cold shielding means installed within said Dewar for reducing the amount of unfocused IR radiation impinging on said staggered linear array, comprising (1) a first cold shield comprising an elongated slit spaced from said staggered linear array to intercept radiation exceeding the focused pixel angular field measured in the scanning direction for pixels in each of said columns, and (2) a second and a third cold shield supported in proximity to the pixels in said staggered linear array, the second shield including successive walls disposed between successive first column pixels, and the third shield including successive walls disposed between successive second column pixels, said walls being oriented orthogonal to said array axis to intercept radiation exceeding the focused pixel angular field measured in the resolution direction, said actual pixel angular fields optimizing the ratio of focused image radiation entering said aperture to unfocused IR radiation from said enclosure.

2. The combination set forth in claim 1, wherein
   said staggered linear IR detector array is formed upon a monolithic member of an IR responsive material, and
   said pixels in the first column are shifted in relation to the pixels in the second column by one half the pixel interval, and
   the spacing between the first cold shield and the array being large in relation to the spacing between columns of pixels so that the differences in resultant pixel angular fields between pixels in the two columns are small and the cold shielding efficiency high.

3. The combination set forth in claim 2 wherein
   said second and third cold shields each consist of an elongated bar-shaped member from which a plurality of slat shaped projections extend at right angles to form said walls, said projections from the respective cold shields being interdigitated.

4. The combination set forth in claim 3 wherein said second and third cold shields are non-reflective.

5. The combination set forth in claim 4 wherein said second and third cold shields are of alumina, having a coefficient of thermal expansion matched to that of said monolithic member.

6. The combination set forth in claim 5 wherein said IR responsive material is InSb.

7. The combination set forth in claim 5 Wherein said IR responsive material is HgCdTe.

8. In an IR sensor for a scanned staggered element linear array, a combination having improved cold shielding efficiency, comprising:
(A) an enclosure normally maintained at ambient temperature, having an aperture for admitting IR radiation, and containing optical means for focusing IR image radiation entering said aperture upon a focal plane,
(B) a cryogenically cooled, evacuated Dewar enclosing said focal plane, said Dewar having an IR transparent window,
(C) n staggered linear monolithic IR detector arrays positioned at said focal plane within said Dewar, the axes of the arrays being parallel and defining the resolution direction and in an orientation orthogonal to the scanning direction, the arrays being disposed in a mutually staggered arrangement of two spaced columns, the end of each staggered linear array in one column overlapping the end of a succeeding array in the other column for continuity in the resolution direction,
each staggered array including first and second columns of pixels, the two columns being spaced apart with the pixels in the first column being shifted in relation to the pixels in the second column,
(D) cold shielding means installed within said Dewar for reducing the amount of unfocused IR radiation impinging on said n staggered linear arrays comprising
(1) a first cold shield plate having n elongated slits, each spaced from a corresponding one of said n staggered linear arrays to intercept radiation exceeding the focused angular field measured in the scanning direction for pixels in each column, and
(2) n pairs of second and third cold shields, each pair supported in proximity to the pixels of a corresponding one of said n staggered linear arrays, each second shield including successive walls disposed between successive first column pixels in a given array, and each third shield including successive walls disposed between successive second column pixels, said walls being oriented orthogonal to said array axis to intercept radiation exceeding the focused pixel angular field measured in the resolution direction,
said actual pixel angular fields optimizing the ratio of focused image radiation entering said aperture to unfocused IR radiation from said enclosure.

9. The combination set forth in claim 8, wherein each of said n staggered linear IR detector arrays are formed upon a monolithic member of an IR responsive material, all assembled upon a common substrate such that the pixels in such successive arrays are equally spaced in the resolution dimension, and in each IR detector array, the pixels in the first column are shifted in relation to the pixels in the second column by one half the pixel interval, and the spacing between the first cold shields and the arrays are large in relation to the spacing between columns of pixels so that the difference in resultant pixel angular fields between pixels in the two columns are small and the cold shielding efficiency high.

10. The combination set forth in claim 9, wherein said second and third cold shields each consist of an elongated bar-shaped member from which a plurality of slat shaped projections extend at right angles to form said walls, said projections from the respective cold shields being interdigitated.

11. The combination set forth in claim 10, wherein said second and third cold shields are non-reflective.

12. The combination set forth in claim 11, wherein said second and third cold shields are of alumina, having a coefficient of temperature expansion matched to that of said monolithic members.

13. The combination set forth in claim 12, wherein said IR responsive material is InSb.

14. The combination set forth in claim 12, wherein said IR responsive material is HgCdTe.

15. In an IR sensor for a scanned staggered element linear array, a combination providing improved cold shielding efficiency, comprising;
(A) an enclosure normally maintained at ambient temperature, having an aperture for admitting IR radiation and containing optical means for focusing IR image radiation entering said aperture upon a focal plane,
(B) a cryogenically cooled, evacuated Dewar enclosing said focal plane, said Dewar having an IR transparent window,
(C) a staggered linear IR detector array containing two columns of pixels positioned at said focal plane within said Dewar, the axis of the array defining the resolution direction and oriented orthogonal to the scanning direction,
(D) cold shielding means installed within said Dewar for reducing the amount of unfocused IR radiation impinging on said staggered linear array, comprising
(1) a first cold shield comprising an elongated slit spaced from said staggered linear array to intercept radiation exceeding the focused pixel angular field measured in the scanning direction for pixels in each of said columns, and
(2) a second and a third cold shields supported in proximity to the pixels in said staggered linear array, and providing successive interdigitated walls disposed between successive first column pixels, and between successive second column pixels, said walls being oriented orthogonal to said array axis to intercept radiation exceeding the focused pixel angular field measured in the resolution direction,
said actual pixel angular fields optimizing the ratio of focused image radiation entering said aperture to unfocused IR radiation from said enclosure.

16. The combination set forth in claim 15, wherein said staggered linear IR detector array is formed upon a monolithic member of an IR responsive material, the pixels in the first column overlapping the pixels in the second column by one half the pixel interval, and the spacing between the first cold shields and the arrays being large in relation to the spacing between columns of pixels so that the differences in resultant pixel angular fields between pixels in the two columns are small and the cold shielding efficiency high.

* * * * *